Sept. 16, 1969        W. E. ANDERSON        3,467,296

PACKAGING MATERIAL AND METHOD OF MANUFACTURING THE SAME

Filed April 11, 1966

INVENTOR
WILLIAM E. ANDERSON

BY *Mandeville & Schweitzer*

ATTORNEYS

3,467,296
PACKAGING MATERIAL AND METHOD OF MANUFACTURING THE SAME
William E. Anderson, Bloomsbury, N.J., assignor to Riegel Paper Corporation, New York, N.Y., a corporation of Delaware
Filed Apr. 11, 1966, Ser. No. 541,811
Int. Cl. B65d 5/06, 5/62
U.S. Cl. 229—3.1       1 Claim

ABSTRACT OF THE DISCLOSURE

The present disclosure is directed to improved packaging materials in which a specific class of thermoplastic coatings (resin, vinyl acetate-ethylene copolymer, wax) is unbalancedly applied, weightwise, to a flexible sheet material after being differentially formulated. The differential coating formulations include common resin to vinyl acetate-ethylene copolymer ratios while varying in wax content.

---

Figure 1:
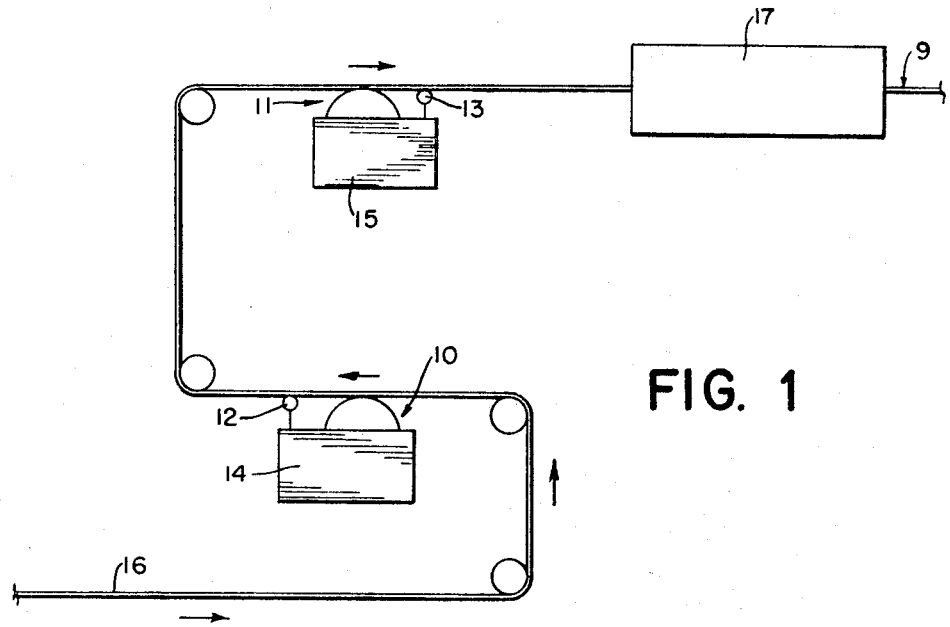

The present invention relates to heat sealable moistureproof materials having "differential, unbalanced" coatings, which materials are especially adapted for use in the packaging of hygroscopic contents such as potato chips, powdered food mixes, and the like in high speed automatic packaging machines of which the various "form and fill" machines are exemplary. Such machines effect package formation and filling in one location at one time and require special material which can be instantly and reliably heat sealed with minimum dwelling of the heat seal jaws and which will readily release the jaws without sticking thereto upon the completion of the formation of the package seam. A typical "form and fill" machine for which the new materials are especially well suited may operate by first overfolding a continuous web of sheet material and then continuously forming a longitudinally extending seam (inside to outside) therein to define a continuous open-ended tube. Thereafter, the tube may be transversely sealed to close off lower portions thereof; it may then be filled through the open end, advanced, and again sealed transversely to restart the forming and filling cycle. Each transverse seam forms, in effect, the top of one package (a filled package) and the bottom of the next package to be filled. Of course, alternate types of "form and fill" machines are in use in which the procedure is different but the requirement for short dwell times and instant jaw release is universal.

In order to be operated at economically feasible, very high speeds, the sealing jaws of the packaging machine must remain uncontaminated from the coatings of the packaging material and must be able to effect, without an unnecessarily long dwell, a seal having sufficient "hot tack," i.e., sufficient cohesiveness to remain intact under the stress of the packaged contents while the adhesive is setting (tacky) and after the sealing jaws have been withdrawn.

More particularly, the present invention relates to a new and improved packaging material having vastly superior properties of resistance to water vapor transmission, "hot tack," and "non-sticking" or sealing jaw release than have been available heretofore, which material is produced by "differentially and unbalancedly" coating a paper, metal foil, or plastic film substrate with compositions of the type generally including fully reacted cyclicized rubber film former, a wax, and a heat sealable material.

Specifically, the above-mentioned three elements when "differentially" formulated (i.e., combined in different proportions) into first and second coatings, which coatings are then applied "unbalancedly" (i.e., in unequal coat weights) to opposite sides of a substrate, provide a packaging material having virtually optimum properties of hot tack, water vapor transmission resistance, and "releasability" in heat seal jaws. Ideally, the elements of the differentially formulated, unbalancedly applied compositions are cyclicized rubbers prepared by carrying to substantially completion the reaction between rubber and inorganic acid in the presence of a phenol catalyst, a high melting point wax, and a heat sealable copolymer of vinyl acetate and ethylene, a combination first disclosed in copending application Ser. No. 336,885, filed Jan. 10, 1964, for "Heat Sealable Moistureproof Coating Composition and Coated Packaging Material Incorporating Same," by James H. Grimm et al., now United States Patent No. 3,403,048.

The coating compositions disclosed in the copending application provide packaging substrates with excellent hot tack, water vapor transmission resistance, and jaw releasing properties. Furthermore, the packaging materials of the type disclosed in the copending application possess highly acceptable gloss, scuff resistance, flexibility, resistance to blocking, compatibility with pigments, etc., and such materials have found immediate and widespread acceptance in the art.

The present invention represents an advancement in the teachings of the aforementioned disclosure and reflects the continuing development in the field of heat sealable, moistureproof packaging materials. Heretofore, it has been the practice to apply a heat sealable moistureproof composition of one formulation to both sides (in equal amounts) of a paper substrate and to use the balancedly coated material in packaging applications. More specifically, both sides of the substrate were coated with a composition having the identical proportions of film former, wax, and heat sealable material (i.e., there being no difference in the constitution of the composition on opposite sides of the substrate) and both sides of the substrate were coated with coatings having identical weights (i.e., there being a balance of the weights of the coatings on the opposite sides of the substrate). Accordingly, the prior art compositions had identical hot tack and water vapor transmission resistance properties regardless of which side was heat sealed, that is, regardless of which side comprised the inside or outside of the subsequently formed package.

The applicant has discovered that a substantially optimized moistureproof, heat sealable packaging material may be provided by applying a relatively light weight coating of a first or internal (in terms of the formed package) composition including a substantially fully reacted cyclicized rubber, a heat sealable material, and relatively small proportions of wax to one surface of a substrate while the other surface is coated with a relatively heavy coating of a second or external composition having similar constituents of substantially fully reacted cyclicized rubber, heat sealable material and wax, but having the wax present in relatively greater proportion than that included in the light weight coating.

Figure 2:
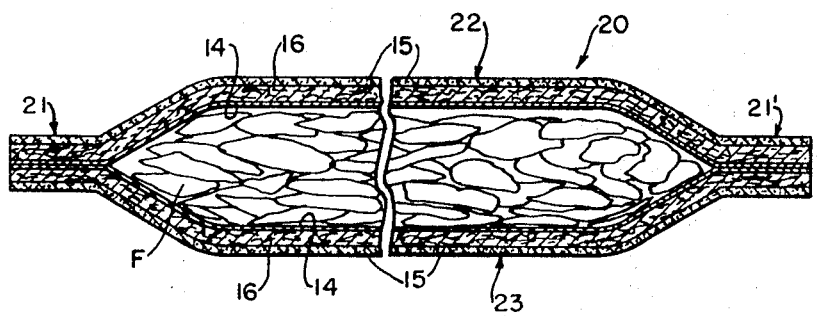

For a more complete understanding of the present invention and its attendant advantages, references should be made to the following detailed description taken in conjunction with the accompanying drawing, in which:

FIG. 1 is a schematic representation of the method of the invention by which the new and improved packaging material is manufactured; and FIG. 2 is a package formed from the new material.

The basic compositions from which the unbalanced, differential coatings of the present invention are derived include a cyclicized rubber resin which is prepared by carrying to substantial completion the reaction between rubber and an inorganic acid in the presence of a phenol catalyst, referred to herein for brevity of description as a "fully reacted cyclicized rubber," a high melting point paraffin wax, and a heat sealing modifier, preferably a copolymer vinyl acetate and ethylene. This basic combination was initially disclosed in the aforementioned copending application Ser. No. 336,885, to which application reference may be had for certain details not included herein.

Specifically, the fully reacted cyclicized rubber (as distinguished from partially reacted cyclicized rubbers of the so-called "Pliolite" type which are more unsaturated) used in the present invention is manufactured in accordance with the general teachings of U. S. Patent No. 2,200,-715. Such a rubber is commercially available from Reichhold Chemical, Inc., under the trade designation "RCI 92-154." More specifically, it is prepared by dissolving No. 1 thick pale crepe rubber in heated phenol to which has been added phosphoric acid as the cyclicized catalyst. After the reaction has progressed to substantial completion, the reaction mixture is cooled and mineral spirit is added, followed by repeated water washing to eliminate substantially all of the phenol. Finally, the mineral spirit is distilled off and the product blown with live steam until the condensate is solvent-free and gives a negative phenol test (ferric chloride). The substantially fully reacted cyclicized rubber resulting from this process is a hard, tough, hornlike resinous polymer having the following approximate properties and characteristics as specified by the manufacturer:

| | |
|---|---|
| Specific gravity, 25° C. | 1.00 |
| Wt. per gal., 25° C. | 8.33 |
| Bulking value, 25° C. | 0.120 |
| Index of refraction, 25° C. | 1.535 |
| Color, U.S.D.A., rosin scale | M |
| Melting point, B & R method °C | 145–165 |
| Melting point, capillary method °C | 125–135 |
| Molecular weight, average | 5,000–10,000 |
| Iodine number | 75–95 |
| Acid value | 0–1 |
| Saponification value | 0 |
| Burning rate | Very slow |
| Dielectric constant, 1000 cy. | 1.35–1.50 |
| Specific surface resistance, ohm | $10^{17}$ |
| Hardness, Sward | 50–60 |

The preferred heat seal modifiers employed in the coatings of the invention are preferably those vinyl acetate-ethylene copolymers which are available commercially under the trade designations "Elvax 250" (28% vinyl acetate), "Elvax 260" (28% vinyl acetate), and "Elvax 40" (40% vinyl acetate) from the E. I. du Pont de Nemours & Co., Inc. It should be understood that other heat sealing modifiers may also be used to advantage. These include, for example, XYHL Polyvinyl Butyral, manufactured by Union Carbide Co.; AYAF Polyvinyl Acetate (softening point 77° C.), manufactured by Union Carbide Co.; AYAT Polyvinyl Acetate (softening point 87.5° C.), manufactured by Union Carbide Co.; Vinylite VMCH, a Vinyl Acetate-Vinyl Chloride Copolymer (13% vinyl acetate), manufactured by Union Carbide Co.; Vinylite VAGH Vinyl, an Acetate-Vinyl Chloride Copolymer (3% vinyl acetate), manufactured by Union Carbide Co.; Ester Gum 8–L Glycerol Ester of Rosin, manufactured by Hercules Powder Co.; and Dow 276 V–2 poly-alpha-methyl styrene, manufactured by Dow Chemical Co.

The wax which is employed with the film forming rubber resin and the heat seal modifier is advantageously a paraffin wax having a melting point of 136–140° F. For example, a wax sold by the Sun Oil Company under the trade designation "Sun 4312" Paraffin Wax has provided excellent results. Microcrystalline and vegetable waxes may also be used with comparable results, although the high melting point paraffin wax is preferred for the especially desirable water vapor transmission resistance it provides.

In accordance with the principles of the invention, a new and improved moistureproof and heat sealable packaging material 9 is manufactured by preparing a "differential" internal and external (in terms of a finished package) solvent solution of coating compositions having outstanding "hot tack," heat sealability, water vapor transmission resistance, and jaw release properties from the basic compositions and applying the coatings in unbalanced weights and in a single pass through the coating equipment to a substrate of glassine, bleached kraft paper, cellophane, polyethylene, polypropylene, aluminum foil, polyethylene terephthalate, or like polyester films, metal foils, and paper materials.

As an important aspect of the invention, it has been determined that an effectively optimized packaging material may be produced by fixing the proportion of rubber resin to vinyl acetate-ethylene copolymer for both the internal and external coatings and differentiating the wax content, there being substantially more wax in the external coating than in the internal coating. Each of the "differential" compositions is prepared in a toluene solution which is approximately 20% solids in most instances. Higher solids contents than 20% may be desirable in some instances to reduce drying requirements; however, uniformity and quality of the applied coatings is more easily maintained with the aforementioned 20% solids level.

By way of specific example, the following differential internal and external coating formulations have been found to provide optimum properties of heat seal, hot tack, and water vapor transmission resistance when unbalancedly, sequentially applied in respectively lighter and heavier coat weights without an intermediate forced drying step to a glassine substrate having a basis weight of from 24–35 pounds per ream.

| Internal coating: | Parts by weight |
|---|---|
| Substantially fully reacted cyclicized rubber (RCI 92-154) | 55 |
| Vinyl acetate-ethylene copolymer (28% vinyl acetate—Elvax 250) | 35 |
| High melting point paraffin wax (Sun 4312) | 20 |
| Toluene, approximately | 1270 |
| External coating: | |
| Substantially fully reacted cyclicized rubber (RCI 92-154) | 55 |
| Vinyl acetate-ethylene copolymer (28% vinyl acetate—Elvax 250) | 35 |
| High melting point paraffin wax (Sun 4312) | 35 |
| Toluene, approximately | 1380 |

More specifically, knife coaters 10, 11 of the so-called Mayer type, having rotating rods 12, 13 in the apices, are used to apply the internal coating 14 and the external coating 15, respectively, to the opposite sides of a substrate 16. The rod 12 is covered by a closely wound small sized wire while the rod 13 is covered by a closely wound large size wire, it being well known in the art that the larger the size of the wire winding on the rod the heavier will be the coating applied and vice versa.

In accordance with the invention, the internal coating composition 14 having relatively small amounts of wax (only 20 parts) compared to the larger quantities of rubber resin (55 parts) and heat seal modifier (35 parts) is applied to a moving 30 pound glassine substrate 16 in relatively light weights of 1½ pounds per ream (3,000 sq. ft.). Although this light weight of low wax content composition may be applied in weights slightly in excess of or slightly less than 1½ pounds per ream, it has been determined that the 1½ pounds weight approximates the substantial, practical minimum which may be applied without diminishing the quality of heat sealability and without introducing stringent manufacturing tolerances.

After having been coated with the internal composition 14 which provides "outstanding" hot tack and heat seal properties, the substrate 16 is then directed to the second coating station 11 where it is coated with the external coating composition 15 which is applied in substantially heavier weights, that is, in the range of approximately 3 to 5½ pounds per ream (3,000 sq. ft.) in comparison to the weight of the internal coating. Thus it should be understood that the external coating 15 is unbalanced weightwise with respect to the internal coating 14 as well as being differentiated from the coating 14 by its substantially increased wax content (the external coating having 75% more wax than the internal coating). As an important aspect of the invention, the external coating 15 provides the new material 9 with optimized resistance to water vapor transmission (e.g., values of 0.05 flat and 0.15 creased, as determined by TAPPI Method T 464 M-45) and superior "jaw release" or "anti-stick" properties. Coatings 14, 15 are, of course, sealable to one another.

To complete the manufacture of the new packaging material 9, the substrate 16 carrying a heavy coating with relatively low wax content on one side and a light coating with relatively high wax content on the other side is directed through a dryer 17 to drive off the toluene solvent. As will be appreciated, the finished packaging material is aptly characterized as being "differentially, unbalancedly coated."

The new material 9 having superior moistureproof properties is especially useful in packaging potato chips and like hygroscopic foodstuffs F, since it prevents the chips from becoming soggy while on the shelf. Furthermore, by virtue of its excellent "hot tack" and "jaw release" properties, the new material is especially suited for use with "form and fill" machinery.

For example, the filled package 20 shown in FIG. 2 in a horizontal position, may be formed on a "form and fill" machine of the type described hereinabove. Thus an open tube having opposed walls 22, 23 will be established (by sealing an internal surface to an external surface of the material 9) and supported in the machine in a vertical position. Application of heat sealing pressure through heated jaws (not shown) applied against the outer surfaces of the packaging material forms a transverse seam 21 by activating and uniting the opposed internal coatings 14. As a very important aspect of the invention, the seam 21 is established with an absolute minimum of dwell of the heated jaws, which jaws will not pick up any of the external coating 16. The freedom of contamination of the jaws, i.e., the superior jaw release, is an important and beneficial result of the "unbalanced, differential" coatings 14, 15.

Immediately after the seam 21 is formed and before the activated, cohered coating 14 in the area of the seam 21 has had a chance to set permanently, the foodstuff F is introduced into the tube through the upper, still open end of the vertically disposed tube. Thereafter, the package 20 is completed by advancing the tube to a position in which the jaws may be closed to form another transverse seam 21'. While this operation is being effected, the seam 21 safely supports the load of the contents F, without risk of disruption, due to the excellent "hot tack" properties of the internal coating 14. Absent the superior "hot tack" properties, it would be necessary for the jaws to dwell for a relatively long time during which the formed heat seal was allowed to reach a permanent set. A long dwell greatly reduces the rate of "forming and filling" and increases the likelihood of jaw contamination. Of course, it will be appreciated that the new material enables "form and fill" machinery to be operated at maximum speeds.

The above described "form and fill" operations produce a strip of packages which may be separated from one another merely by severing, it being understood that while in strip form the seams 21, 21' will be of twice the illustrated length. In other words, each transverse seam formed on the machine will comprise in part the top of one package and in part the bottom of the next successively formed package.

From the foregoing, it should be apparent the new packaging material with its differential, unbalanced coatings of fully reacted rubber resin-wax-heat seal modifier compositions provides an optimized material for packaging hygroscopic materials on "form and fill" machinery. The extremely low rates of water vapor transmission (WVTR) ensure that the packaged contents, such as potato chips, nuts, food mixes and the like, will not be deleteriously affected by the passage of moisture through the walls of a package. Moreover, the elements of the coating composition are in nowise harmful to foodstuffs and are of economically feasible costs. Furthermore, the vastly superior hot tack and heat seal properties of the internal surfaces of the material along with the vastly superior jaw release or non-stick properties of the external surfaces of the material make its use in automatic packaging machinery virtually foolproof and allow the machinery in which it is employed to be operated at practical maximum speeds.

An important advantage of the new method of the invention is the comparative ease with which the internal and external coatings may be differentially formulated and applied to the substrate in a single pass. In fact and as will be readily appreciated, simple by adding more wax and toluene to the internal coating solutions they may be converted to external coating solutions since the proportions of rubber resin to heat seal polymer are the same for each of the differential coatings in the above-described, preferred embodiment of the invention.

It will be appreciated that the method of the present invention provides a new and improved packaging material which is differentially and unbalancedly coated with compositions of the general type including a fully reacted cyclicized rubber resin, a wax, and a heat seal modifier, which packaging material possesses more superior "hot tack," water vapor transmission, and "jaw release" properties than have been heretofore been available.

Furthermore, it should be understood that the specific formulation and examples disclosed hereinabove are representative only and that reference should be made to the following appended claim in determining the full scope of the invention.

I claim:
1. A heat sealed, moistureproof container for hygroscopic foodstuffs and the like fabricated from flexible sheet material, in which
(a) inner wall surfaces of said container are coated relatively lightly with a first composition of approximately 55 parts of resin, 35 parts of vinyl acetate-ethylene copolymer, and 20 parts of high melting point paraffin wax;
(b) outer surfaces of said container are coated relatively heavily with a second composition of approximately 55 parts of resin, 35 parts of vinyl acetate-ethylene copolymer, and 35 parts of high melting point paraffin wax;
(c) said resin of said first composition is a substantially fully reacted cyclicized-rubber.

References Cited
UNITED STATES PATENTS

| | | | |
|---|---|---|---|
| 3,025,167 | 3/1962 | Butler | 117—122 X |
| 3,084,984 | 4/1963 | Adler | 99—171 X |
| 3,285,494 | 11/1966 | Baker | 117—122 |
| 3,326,708 | 6/1967 | Hawkins | 117—122 X |
| 2,545,710 | 3/1951 | Snyder | 117—171 |

WILLIAM D. MARTIN, Primary Examiner

B. D. PIANALTO, Assistant Examiner

U.S. Cl. X.R.

99—171; 117—68.5, 122, 155; 229—3.5